US012431028B2

(12) United States Patent
Sankeshwari et al.

(10) Patent No.: US 12,431,028 B2
(45) Date of Patent: Sep. 30, 2025

(54) DETERMINING SAFE TAXI EXITS ON A RUNWAY

(71) Applicant: The Boeing Company, Arlington, VA (US)

(72) Inventors: Akshay Arun Sankeshwari, Karnataka (IN); Ajaya Srikanta Bharadwaja, Karnataka (IN); Umesh Kallappa Hosamani, Karnataka (IN)

(73) Assignee: THE BOEING COMPANY, Arlington, VA (US)

( * ) Notice: Subject to any disclaimer, the term of this patent is extended or adjusted under 35 U.S.C. 154(b) by 153 days.

(21) Appl. No.: 18/467,933

(22) Filed: Sep. 15, 2023

(65) Prior Publication Data

US 2025/0095502 A1 Mar. 20, 2025

(51) Int. Cl.

| | |
|---|---|
| ***G08G 5/51*** | (2025.01) |
| ***G08G 5/21*** | (2025.01) |
| ***G08G 5/26*** | (2025.01) |
| ***G08G 5/76*** | (2025.01) |

(52) U.S. Cl.

CPC ................. *G08G 5/51* (2025.01); *G08G 5/21* (2025.01); *G08G 5/26* (2025.01); *G08G 5/76* (2025.01)

(58) Field of Classification Search

CPC .. G08G 5/51; G08G 5/21; G08G 5/26; G08G 5/76; G08G 5/54

See application file for complete search history.

(56) References Cited

U.S. PATENT DOCUMENTS

| | | | | |
|---|---|---|---|---|
| 10,417,919 | B1 * | 9/2019 | Jayathirtha | B64C 25/426 |
| 2017/0129623 | A1 * | 5/2017 | Brardo | B60T 8/1703 |
| 2018/0061243 | A1 * | 3/2018 | Shloosh | G08G 5/21 |

OTHER PUBLICATIONS

Jacob et al., "The Runway Overrun Prevention System," Safety First #08, Jul. 2009, pp. 1-8.

Wallsworth, "Stopping! All about Brakes and BTV Brake to Vacate," Mar. 7, 2014 Blog, https://captain-daves.com/2014/03/07/flying-the-airbus-a380-part2-stopping (downloaded on Jun. 14, 2023), 26 pages.

* cited by examiner

*Primary Examiner* — Behrang Badii

(74) *Attorney, Agent, or Firm* — MH2 Technology Law Group LLP

(57) ABSTRACT

A computing system on an aircraft that is configured to perform operations including receiving historical data. The operations also include training a model using the historical data to produce a trained model. The operations also include receiving current pre-landing data for a current aircraft that is to land on a runway. The operations also include determining, during a time period before landing, a feasibility of a plurality of taxi exits on the runway based at least partially upon the trained model and the current pre-landing data. The operations also include selecting one of the taxi exits based at least partially upon the feasibility.

20 Claims, 5 Drawing Sheets

DETERMINING SAFE TAXI EXITS ON A RUNWAY

TECHNICAL FIELD

The present teachings relate generally to determining a touch-down location for an aircraft on a runway and determining a taxi exit for the aircraft to exit the runway.

BACKGROUND

Landing is one of the most crucial phases of flight. Enhanced awareness of the runway configuration and feasibility of exiting via specific taxi exits will not only enhance safety but also considerably improve the runway occupancy time. In many cases, pilots plan the taxi exit on the runway when they are in the air and on the final approach. This may be due to advance notice by the air traffic controller, or it may be planned by the pilot based on the arrival gate location. However, based on the touch-down location in the runway, the pilot may not be able to control the speed of the aircraft by the time the aircraft reaches the planned taxi exit. This may result in applying a harsh brake to meet the planned taxi exit, which may impact the tires and braking system of the aircraft.

Alternatively, the aircraft may overshoot the planned taxi exit. If the aircraft overshoots the planned taxi exit, the aircraft may have to go to the end of the runway at slower speeds and make a U-turn to backtrack to the planned taxi exit. This causes increased runway occupancy time. Increased runway occupancy time can drastically bring down the runway throughput at an airport. This will also result in the aircraft reaching the gate late.

SUMMARY

A computing system on an aircraft is disclosed. The computing system is configured to perform operations including receiving historical data. The operations also include training a model using the historical data to produce a trained model. The operations also include receiving current pre-landing data for a current aircraft that is to land on a runway. The operations also include determining, during a time period before landing, a feasibility of a plurality of taxi exits on the runway based at least partially upon the trained model and the current pre-landing data. The operations also include selecting one of the taxi exits based at least partially upon the feasibility.

A method for selecting a taxi exit on a runway is also disclosed. The method includes receiving historical data. The historical data includes historical runway data for a runway, historical aircraft data for previous aircrafts that have landed on the runway, historical weather data at a location of the runway, and historical notice to air missions (NOTAMs) for the previous aircrafts, the runway, or both. The method also includes training a model using the historical data to produce a trained model. The method also includes receiving current pre-landing data for a current aircraft that is to land on the runway. The current pre-landing data includes current pre-landing aircraft data for the current aircraft, current weather data at the location of the runway; and a current NOTAM for the current aircraft, the runway, or both. The method also includes determining, during a time period before landing, a feasibility of a plurality of taxi exits on the runway based at least partially upon the trained model and the current pre-landing data. Determining the feasibility includes dividing the plurality of taxi exits into at least a first group and a second group. The current aircraft will either overshoot the first group of taxi exits or have to decelerate more than a predetermined deceleration threshold to access the first group of taxi exits if the current aircraft lands within the touch-down zone on the runway and does not have to turn around on the runway. The current aircraft will neither overshoot the second group of taxi exits nor have to decelerate more than the predetermined deceleration threshold to access the second group of taxi exits if the current aircraft lands within the touch-down zone on the runway and does not have to turn around on the runway. The method also includes determining a touch-down location for the current aircraft on the runway based at least partially upon the trained model, the current pre-landing data, and the feasibility. The method also includes receiving current post-landing data for the current aircraft after the current aircraft lands on the runway. The current post-landing data includes the touch-down location of the current aircraft on the runway, a speed of the current aircraft on the runway, or both. The method also includes updating the feasibility during a time period after landing to produce an updated feasibility. The updated feasibility is based at least partially upon the current post-landing data. The method also includes selecting one of the taxi exits in the second group based at least partially upon the updated feasibility.

A method for selecting a taxi exit on a runway for an aircraft that lands on the runway is also disclosed. The method includes receiving historical data. The historical data includes historical runway data for a runway. The historical runway data includes a length of the runway, a length and a location of a touch-down zone on the runway, and locations of a plurality of taxi exits along the runway. The historical data also includes historical aircraft data for previous aircrafts that have landed on the runway. The historical aircraft data includes specification information of the previous aircrafts, published aircraft performance data for the previous aircrafts, speeds in the air of the previous aircrafts in a time period before landing, elevations of the previous aircrafts in the time period before landing, trajectories of the previous aircrafts in the time period before landing, distances between the previous aircrafts and the runway in the time period before landing, touch-down locations on the runway of the previous aircrafts, displaced thresholds for the previous aircrafts, decelerations on the runway of the previous aircrafts, the taxi exits used by the previous aircrafts, taxi times after landing of the previous aircrafts, and fuel consumed after landing of the previous aircrafts. The historical data also includes historical weather data at a location of the runway. The historical data also includes historical notice to air missions (NOTAMs) for the previous aircrafts, the runway, or both. The method also includes training a model using the historical data to produce a trained model. The method also includes receiving current pre-landing data for a current aircraft that is to land on the runway. The current pre-landing data includes current pre-landing aircraft data for the current aircraft. The current pre-landing aircraft data includes specification information of the current aircraft, published aircraft performance data for the current aircraft, a speed in the air of the current aircraft in the time period before landing, an elevation of the current aircraft in the time period before landing, a trajectory of the current aircraft in the time period before landing, and a distance between the current aircraft and the runway in the time period before landing. The current pre-landing data also includes current weather data at the location of the runway. The current pre-landing data also includes a current NOTAM for the current aircraft, the runway, or both. The method also includes determining, during the time period before landing, a feasibility of the plurality of taxi exits on the runway based at least partially upon the trained model and the current pre-landing data. Determining the taxi exit feasibility includes dividing the plurality of taxi exits into at least a first group and a second group. The current aircraft will either overshoot the first group of taxi exits or have to decelerate more than a predetermined deceleration threshold to access the first group of taxi exits if the current aircraft lands within the touch-down zone on the runway and does not have to turn around on the runway. The current aircraft will neither overshoot the second group of taxi exits nor have to decelerate more than the predetermined deceleration threshold to access the second group of taxi exits if the current aircraft lands within the touch-down zone on the runway and does not have to turn around on the runway. The method also includes determining a touch-down location for the current aircraft based at least partially upon the trained model, the current pre-landing data, and the feasibility. The method also includes receiving current post-landing data after the current aircraft lands on the runway. The current post-landing data includes current post-landing aircraft data for the current aircraft. The current post-landing aircraft data includes the touch-down location of the current aircraft on the runway and a speed of the current aircraft on the runway. The method also includes updating the feasibility during a time period after landing to produce an updated feasibility. The updated feasibility is based at least partially upon the trained model, the current pre-landing data, and the current post-landing data. The method also includes selecting one of the taxi exits in the second group based at least partially upon the updated feasibility.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
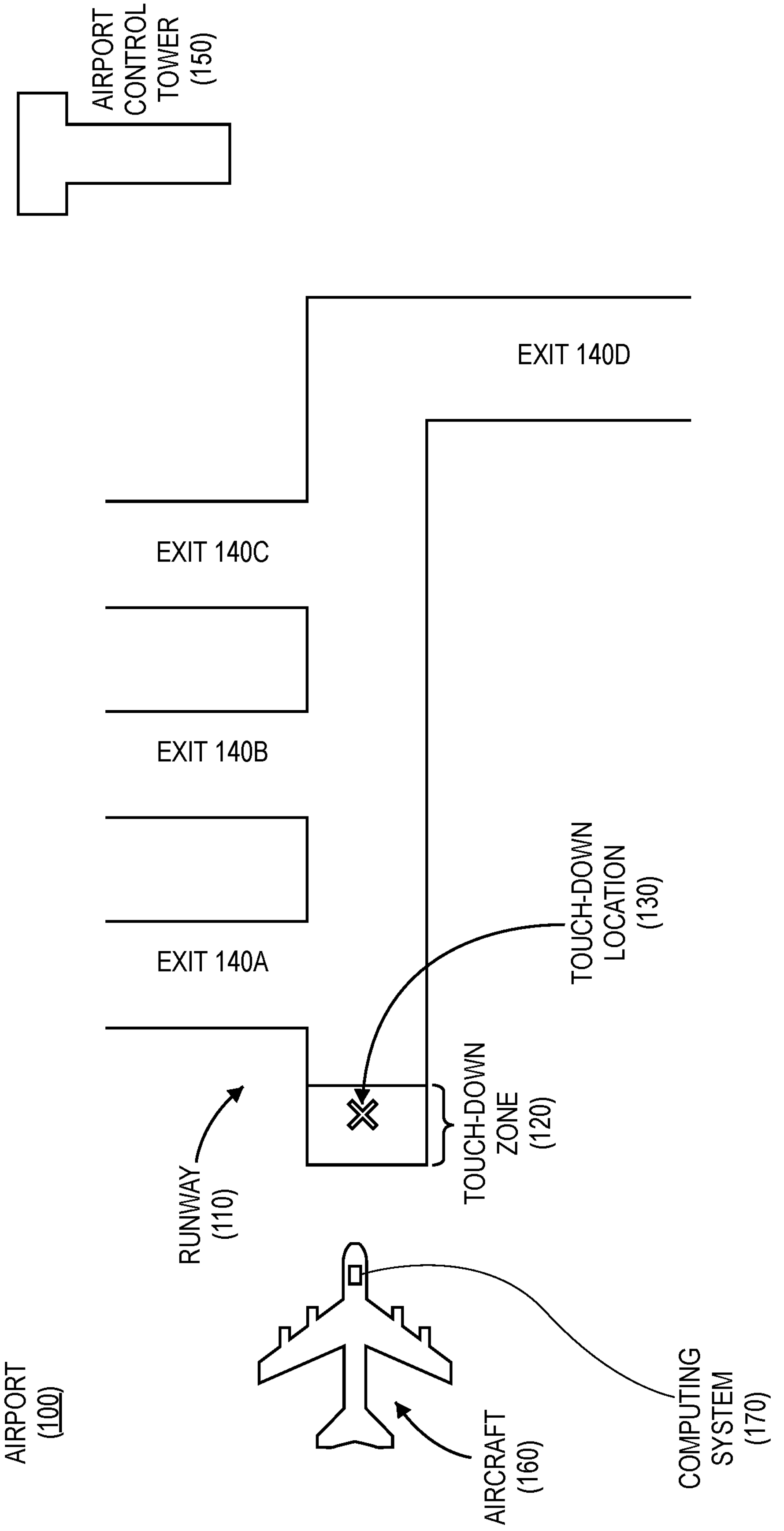
FIG. 1 illustrates a schematic view of an airport, according to an example.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on." "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower." "above." "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a schematic view of an airport 100, according to an example. The airport 100 may include one or more runways (one is shown: 110). The runway 110 may include a touch-down zone 120. As used herein, the touch-down zone 120 refers to a predetermined length on the beginning of the runway 110 within which the aircraft 160 is to touch-down (i.e., land). The touch-down zone 120 may be marked on the runway 110. The touch-down location of the aircraft 160 is shown with reference number 130.

The runway 110 may also include one or more taxi exits (four are shown: 140A-140D). As used herein, a taxi exit 140A-140D (also referred to as an exit or runway exit) refers to a (e.g., paved) path or road that allows the aircraft 160 to exit the runway 110 en route to a location where the aircraft 160 may deboard (e.g., a gate at an airport 100). The taxi exits 140A-140D may be oriented substantially perpendicular to the runway 110. The taxi exits 140A-140D may be located different distances from the touch-down zone 120 on the runway 110.

The aircraft 160 may be or include an airplane, a spacecraft, an unmanned aerial vehicle (e.g., a drone), or the like. The aircraft 160 may include a computing system 170. In another implementation, the computing system 170 may be located at an air traffic controller station 150 on the ground. The computing system 170 may be configured to determine and recommend one or more feasible taxi exits 140A-140D on the runway 110 for the aircraft 160. As used herein, a feasible taxi exit refers to a taxi exit 140A-140D that the aircraft 160 will be able to use given the touch-down location 130 of the aircraft 160, the speed of the aircraft 160 when it touches down, the conditions of the runway 110 (e.g., wet, icy, etc.), and a deceleration of the aircraft 160 on the runway 110 being less than a predetermined deceleration threshold. The computing system 170 may also determine and recommend the touch-down location 130 of the aircraft 160 based at least partially upon the selected taxi exit 140A-140D.

The pilot visually targets the touch-down location 130 when the pilot is carrying out a visual approach or once the runway 110 is in sight for the pilot carrying out an instrument approach. This touch-down location 130 may not be optimal, as this is a static marking that does not consider type or performance of the aircraft 160. In a visual approach, or after sighting the runway 110 in an instrument approach, the pilot has the freedom to plan the touch-down location 130 outside of the touch-down zone 120. Currently, there is no solution that determines the touch-down location 130 based at least partially upon the planned taxi exit 140A-140D and the performance of the aircraft 160.

Figure 2:
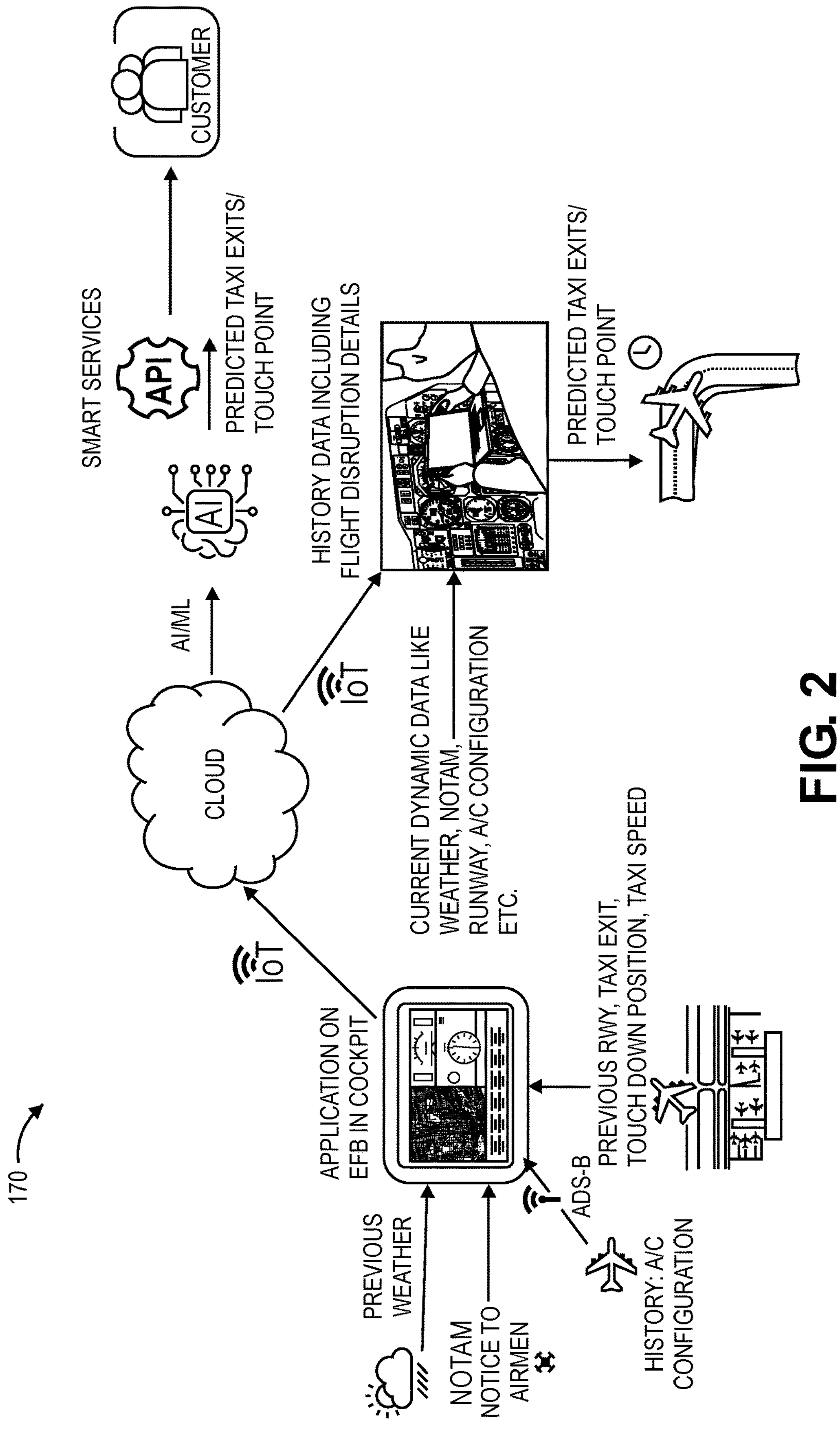
FIG. 2 illustrates a schematic view of a computing system on the aircraft determining a touch-down location and/or taxi exit, according to an example.

FIG. 2 illustrates a schematic view of the computing system 170 determining the touch-down location 130 and/or taxi exit 140A-140D, according to an example. When the aircraft 160 is in the air, the computing system 170 may determine and inform the pilot about the feasible taxi exits 140A-140D. The computing system 170 may also allow the pilot to select a proposed taxi exit 140A-140D on an electronic flight bag (EFB) device. Considering the aircraft type and/or aircraft performance, the computing system 170 may determine and inform the pilot whether the selected taxi exit 140A-140D is feasible. If the selected taxi exit 140A-140D is feasible, then computing system 170 may determine the optimal touch-down location 130 for the aircraft 160 to reduce harsh braking after landing and minimize the runway occupancy. After landing, considering the current position and/or speed of the aircraft 160, the computing system 170 may update the feasible taxi exits 140A-140D based at least partially upon the current location and speed of the aircraft 160 on the runway 110. The computing system 170 may also take into account the prevailing weather (e.g., is the runway wet or icy), displaced thresholds, applicable notice to air missions (NOTAMs), etc. As used herein, displaced thresholds refer to the point on the runway 110 other than designated beginning of the runway 110 which reduces the available runway length.

The computing system 170 may also help a pilot to identify the safe taxi exits 140A-140D based on historical data. More particularly, the computing system 170 may use previously-collected data about the aircraft 160, other aircrafts that have landed on the runway 110, the runway 110 itself, the weather around the runway 110, etc. to predict the safe taxi exits 140A-140D and touch-down location 130 for the given (opted) taxi exit 140A-140D. The computing system 170 may also highlight the taxi exits 140A-140D (e.g., in different colors). For example, a check mark (or the color green) may indicate safe taxi exits 140A-140D, a question mark (or the color amber or yellow) may indicate possibly unfeasible taxi exits 140A-140D, and an X (or the color red) may indicate taxi exits 140A-140D that are not feasible to use.

Once the aircraft 160 has landed and is rolling on the runway 110, the computing system 170 may re-calculate the possible safe taxi exits 140A-140D based on the current aircraft location, speed, and/or deceleration rate. In addition to predicting the safe taxi exits 140A-140D, the computing system 170 may also provide useful information for each taxi exit 140A-140D such as average taxi time for each taxi exit 140A-140D, fuel consumed using each taxi exit 140A-140D, and runway occupancy time for each taxi exit 140A-140D, which helps the pilot to select a taxi exit 140A-140D.

The computing system 170 may build and train a model over a time period by monitoring the following data for each of the aircraft 160 to obtain analytics: runway and airport, seasonal and/or weather data, aircraft configuration (e.g., speed, altitude, age, category, etc.), NOTAMs data, touch-down point, runway taxi exit options, taxi time for each exit option, fuel consumed for each exit option, passenger comfort, etc. The collected data may then be used to build and train model. The model is then used to predict safe taxi exits or touch-down for given situations (e.g., weather, NOTAM, etc.).

The computing system 170 may reduce the runway occupancy time, minimize the possibility of overshooting the planned taxi exit 140A-140D, reduce safety concerns such as runway excursion, reduce the overall delays, and reduce the fuel consumption and/or carbon emissions.

Figure 3:
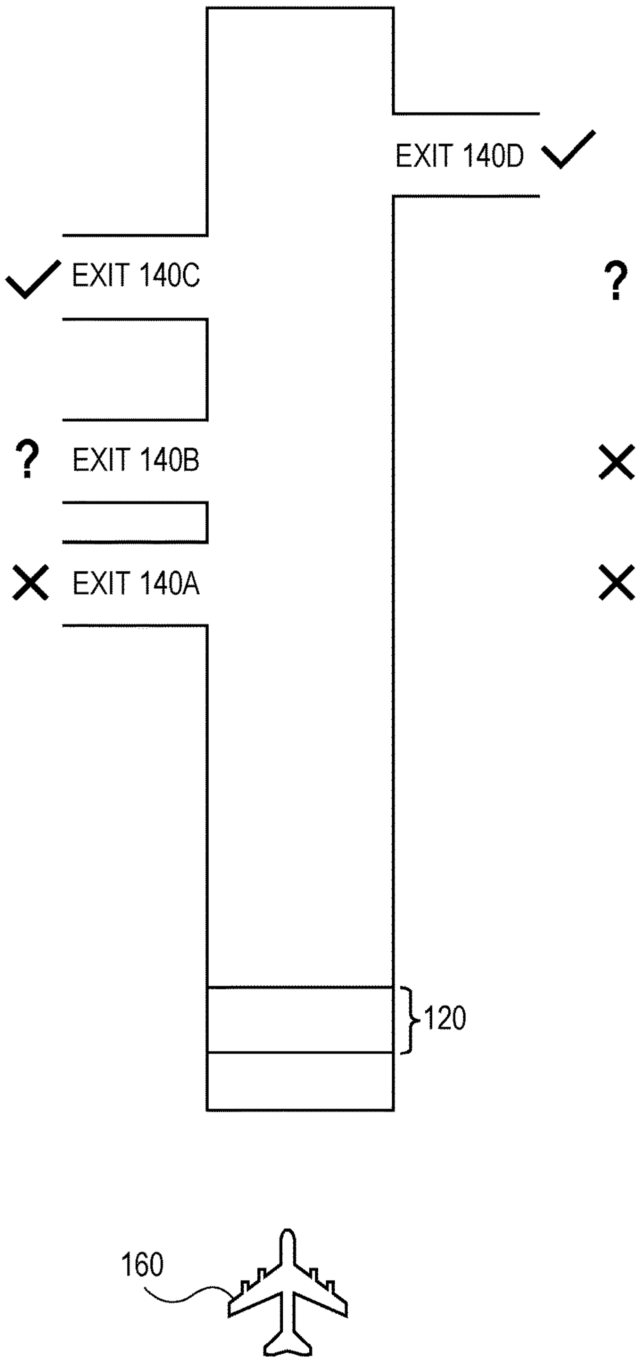
FIG. 3 illustrates a schematic view of an aircraft approaching a runway with the taxi exits determined, according to an example.

FIG. 3 illustrates a schematic view of the aircraft 160 approaching the runway 110 with the taxi exits 140A-140D determined and marked, according to an example. While the aircraft 160 is in the air (i.e., before the aircraft 160 has landed), the computing system 170 may identify and display all of the taxi exits 140A-140D on the runway 110. The computing system 170 may also determine which of the taxi exits 140A-140D are feasible for the aircraft 160 to use if (1) the aircraft 160 lands within a predetermined touch-down zone 120 on the runway 110 and/or (2) the aircraft deceleration remains less than the predetermined deceleration threshold. In the example shown in FIG. 2, the first taxi exit 140A may be determined to be in a first (e.g., infeasible) group to the aircraft 160 (e.g., because it may require deceleration greater than the predetermined deceleration threshold). The second taxi exit 140B may be in a second (e.g., possibly feasible) group to the aircraft 160. The third and fourth taxi exits 140C, 140D may be in a third (e.g., feasible) group to the aircraft 160.

The computing system 170 may also determine one or more values for the taxi exits 140A-140D. For example, if the aircraft 160 uses the third taxi exit 140C, the computing system 170 may determine that the taxi time is 10 minutes, the aircraft 160 will use about 10 kg of fuel to taxi, and the runway occupancy time (ROT) is about 2 minutes.

Figure 4:
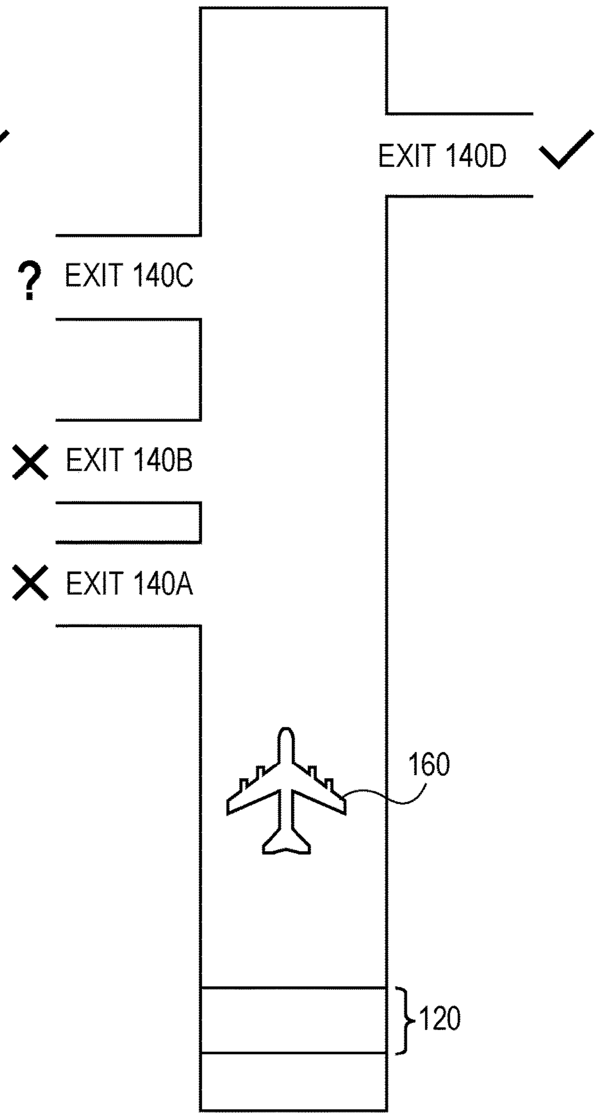
FIG. 4 illustrates a schematic view of the aircraft just after landing on the runway with the taxi exits updated, according to an example.

FIG. 4 illustrates a schematic view of the aircraft 160 just after landing on the runway 110 with the taxi exits 140A-140D updated and marked, according to an example. Once the aircraft 160 lands on the runway 110, the computing system 170 may re-determine which of the taxi exits 140A-140D are feasible for the aircraft 160 to use. The first determination (FIG. 2) and the second determination (FIG. 3) may possibly vary from one another due to the actual touch-down location differing from the projected touch-down location, the actual speed of the aircraft 160 before, during, or after landing differing from the projected speed, the actual deceleration of the aircraft 160 before, during, or after landing differing from the projected deceleration, the actual conditions in the air (e.g., wind, humidity, etc.) differing from the projected conditions, the actual conditions of the runway 110 (e.g., wet, ice, etc.) differing from the projected conditions, or a combination thereof.

In the example shown in FIG. 3, the first and second taxi exits 140A, 140B may be determined to be in the first (e.g., infeasible) group to the aircraft 160 (e.g., because they may require deceleration greater than the predetermined deceleration threshold). The third taxi exit 140C may be in the second (e.g., possibly feasible) group to the aircraft 160. The fourth taxi exit 140D may be in the third (e.g., feasible)

group to the aircraft 160. The computing system 170 may also re-determine one or more values for the taxi exits 140A-140D. For example, if the aircraft 160 uses the fourth taxi exit 140C, the computing system 170 may determine that the taxi time is 12 minutes, the aircraft 160 will use about 10 kg of fuel to taxi, and the ROT is about 3 minutes.

Figure 5:
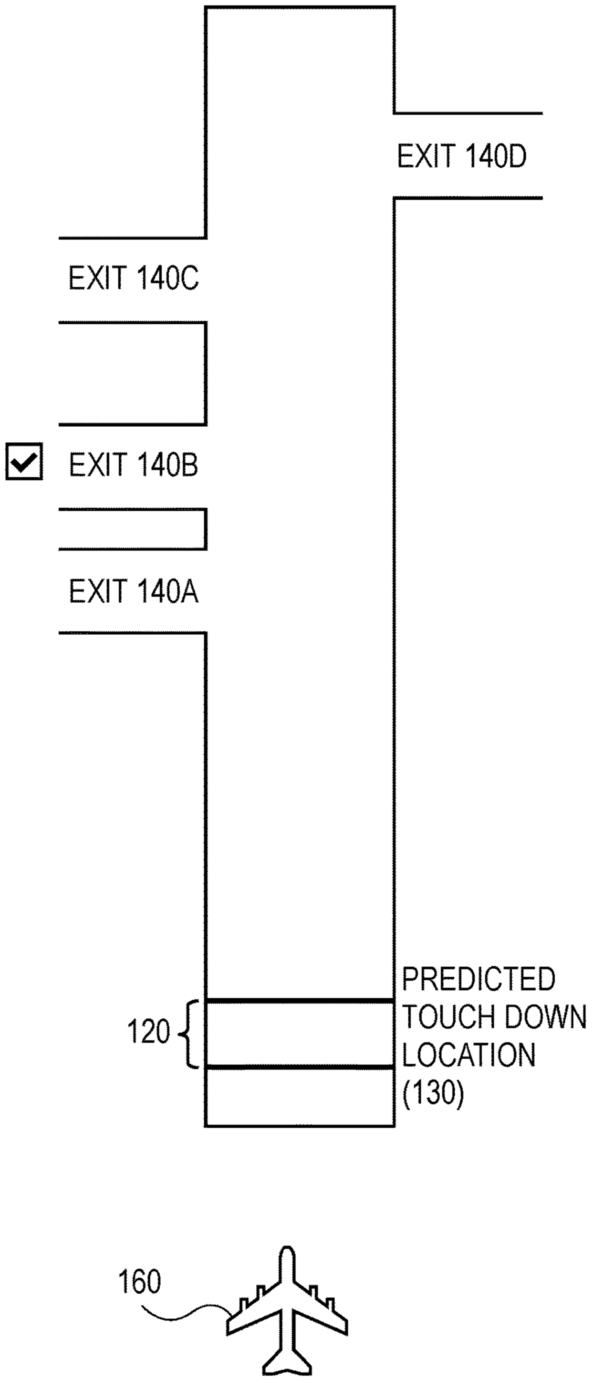
FIG. 5 illustrates a schematic view of the aircraft approaching the runway with the touch-down location determined and marked to safely access a predetermined taxi exit, according to an example.

FIG. 5 illustrates a schematic view of the aircraft 160 approaching the runway 110 with the touch-down location 130 determined and marked to safely access a predetermined taxi exit 140A-140D, according to an example. The pilot may select the desired taxi exit (e.g., taxi exit 140B) prior to landing. Based at least partially upon this selection, the computing system 170 may determine the touch-down location 130 of the aircraft 160 and whether this touch-down location 130 is within the touch-down zone 120. In the example shown in FIG. 4, the touch-down location 130 is within the touch-down zone 120 for the aircraft 140B to use the second taxi exit 140B.

Figure 6:
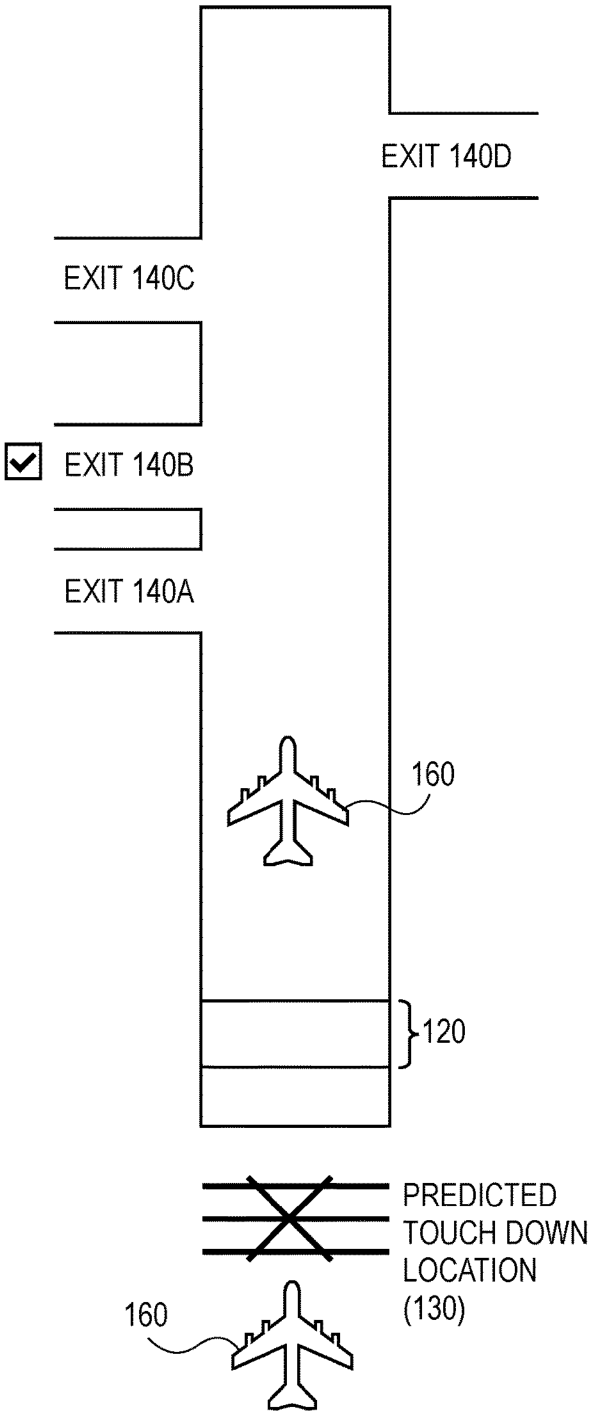
FIG. 6 illustrates a schematic view of the aircraft approaching the runway with the touch-down location determined and marked before the beginning of the runway to access a predetermined taxi exit, according to an example.

FIG. 6 illustrates a schematic view of the aircraft 160 approaching the runway 110 with the touch-down location 130 determined and marked before the beginning of the runway 140 to access a predetermined taxi exit 140B, according to an example. In this example, if the pilot desires to use the taxi exit 140B, the computing system 170 has determined that the touch-down location 130 for the aircraft 160 would need to be outside of the touch-down zone 120 (e.g., before the beginning of the runway 110). This may allow the pilot to then select a different desired taxi exit (e.g., taxi exit 220C or 220D) so that the aircraft 160 may land within the touch-down zone 120.

Figure 7:
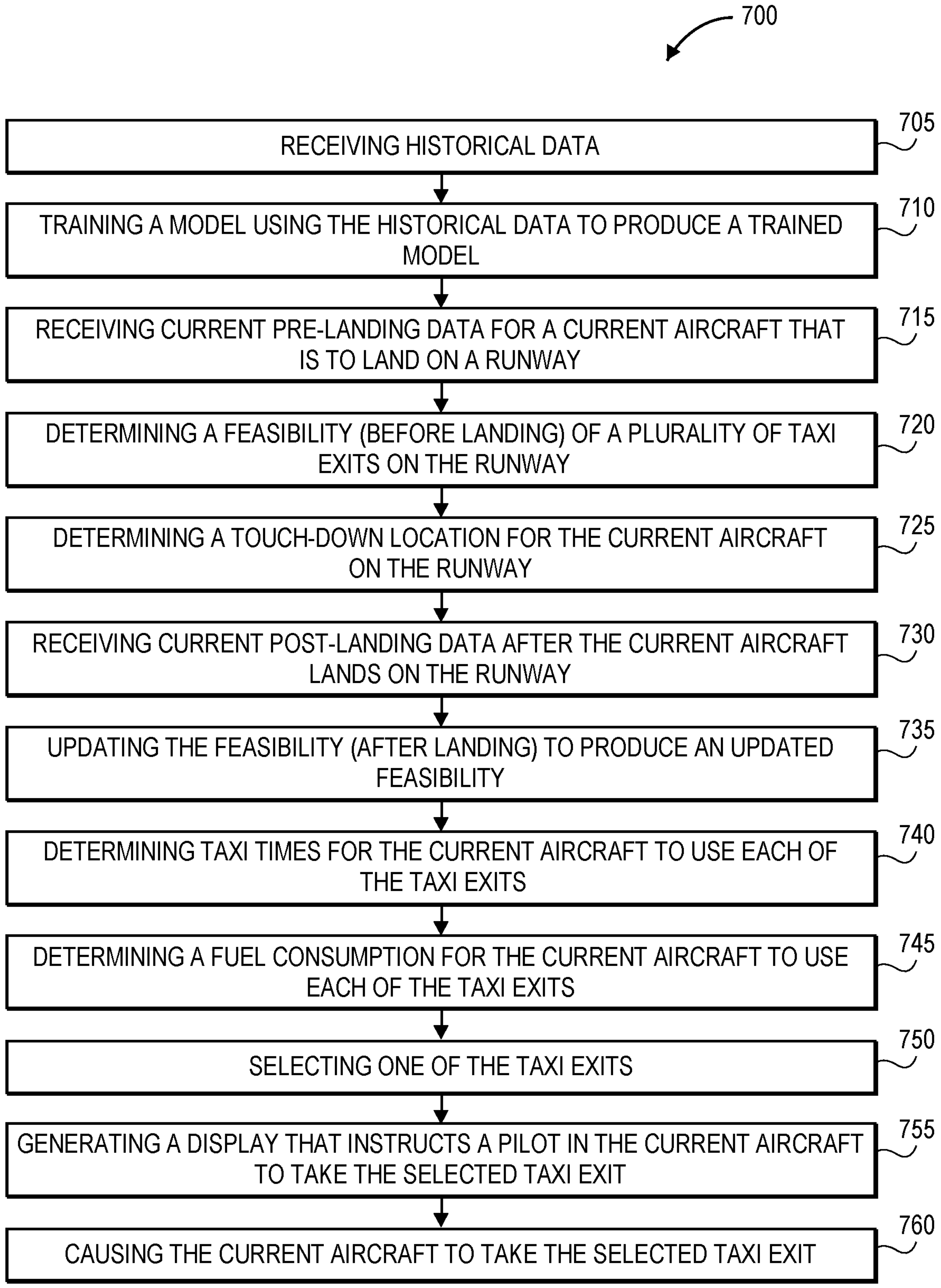
FIG. 7 illustrates a flowchart of a method for determining touch-down location and/or a taxi exit for an aircraft, according to an example.

FIG. 7 illustrates a flowchart of a method 700 for determining a taxi exit 140A-140D for the aircraft 160 on the runway 110, according to an example. An illustrative order of the method 700 is provided below; however, one or more steps of the method 700 may be performed in a different order, simultaneously, repeated, or omitted. One or more steps of the method 700 may be performed by the computing system 170.

The method 700 may include receiving historical data, as at 705. The historical data may include historical runway data for the runway 110. The historical runway data may include a length of the runway 110, a length and/or a location of the touch-down zone 120 on the runway 110, locations of the taxi exits 140A-140D along the runway 110, or a combination thereof.

The historical runway data may also include historical aircraft data for previous aircrafts that have landed on the runway 110. The historical aircraft data may include specification information of the previous aircrafts (e.g., aircraft configuration (including all up-weight), time taken to vacate the runway 110, exit taken by the aircraft 100, etc.), published aircraft performance data for the previous aircrafts (e.g., acceleration and deceleration capabilities, braking capabilities, wake turbulence category, etc.), speeds in the air of the previous aircrafts in a time period (e.g., 2 minutes) before landing, elevations of the previous aircrafts in the time period before landing, trajectories of the previous aircrafts in the time period before landing, distances between the previous aircrafts and the runway 110 in the time period before landing, touch-down locations on the runway 110 of the previous aircrafts, displaced thresholds for the previous aircrafts, decelerations on the runway 110 of the previous aircrafts, the taxi exits 140A-140D used by the previous aircrafts, taxi times after landing (e.g., before parking and/or deboarding) of the previous aircrafts, fuel consumed after landing of the previous aircrafts, or a combination thereof.

The historical runway data may also include historical weather data at the location of the runway 110 (e.g., by month). The historical runway data may also include historical notice to air missions (NOTAMs) for the previous aircrafts, the runway 110, or both.

The method 700 may also include training a model using the historical data to produce a trained model, as at 710.

The method 700 may also include receiving current pre-landing data for the current aircraft 160 that is to land on the runway 110, as at 715. The current pre-landing data may include current pre-landing aircraft data, which may include specification information of the current aircraft 160, published aircraft performance data for the current aircraft 160, a speed in the air of the current aircraft 160 in the time period before landing, an elevation of the current aircraft 160 in the time period before landing, a trajectory of the current aircraft 160 in the time period before landing, a distance between the current aircraft 160 and the runway 110 in the time period before landing, or a combination thereof.

The current pre-landing data may also include current weather data at the location of the runway 110 and/or a current NOTAM for the current aircraft 160, the runway 110, or both.

The method 700 may also include determining a feasibility of a plurality of taxi exits 140A-140D on the runway 110, as at 720. The determination may be made during the time period before landing. The determination may be made based at least partially upon the trained model and/or the current pre-landing data. In one example, determining the feasibility may include dividing the plurality of taxi exits 140A-140D into at least a first group (e.g., taxi exits 140A, 140B) and a second group (e.g., taxi exits 140C, 140D). The current aircraft 160 may either overshoot the first group of taxi exits 140A, 140B or have to decelerate more than a predetermined deceleration threshold to access the first group of taxi exits 140A, 140B without having to turn around if the current aircraft 160 lands within the touch-down zone 120 on the runway 110. The current aircraft may neither overshoot the second group of taxi exits 140C, 140D nor have to decelerate more than the predetermined deceleration threshold to access the second group of taxi exits 140C, 140D without having to turn around if the current aircraft 160 lands within the touch-down zone 120 on the runway 110.

The method 700 may also include determining the touch-down location 130 for the current aircraft 160, as at 725. The touch-down location 130 may be based at least partially upon the trained model, the current pre-landing data, the feasibility, or a combination thereof. For example, the touch-down location 130 may be determined based at least partially upon one of the taxi exits 140C, 140D in the second group. The method 700 may also include adjusting the aircraft 100 (e.g., in flight) to cause the aircraft 100 to land at the determined touch-down location 130. The adjustments may be to the deceleration, speed, elevation, trajectory. In another example, the adjustments may include actuating one or more flaps.

The method 700 may also include receiving current post-landing data after the current aircraft 160 lands on the runway 110, as at 730. The current post-landing data may include current post-landing aircraft data such as the (e.g., determined and/or actual) touch-down location 130 of the current aircraft 160 on the runway 110, a speed of the current aircraft 160 on the runway 110, or both.

The method 700 may also include updating the feasibility during a time period (e.g., 10 seconds) after landing to produce an updated feasibility, as at 735. The updated feasibility may be based at least partially upon the trained model, the current pre-landing data, the feasibility, the current post-landing data, or a combination thereof.

The method 700 may also include determining the taxi times for the current aircraft 160 to use each of the taxi exits 140A-140D, as at 740. This may include the taxi times for the current aircraft 160 to use each of the taxi exits in the second group 140C, 140D. The determination may be based at least partially upon the trained model, the current pre-landing data, the feasibility, the current post-landing data, the updated feasibility, or a combination thereof.

The method 700 may also include determining the fuel consumption for the current aircraft 160 to use each of the taxi exits 140A-140D, as at 745. This may include the fuel consumption for the current aircraft 160 to use each of the taxi exits in the second group 140C, 140D. The determination may be based at least partially upon the trained model, the current pre-landing data, the feasibility, the current post-landing data, the updated feasibility, or a combination thereof.

The method 700 may also include selecting one of the taxi exits 140A-140D, as at 750. This may include selecting one of the taxi exits in the second group 140C, 140D. The selection may be based at least partially upon the trained model, the current pre-landing data, the feasibility, the current post-landing data, the updated feasibility, the determined taxi times, the determined fuel consumption, or a combination thereof.

The method 700 may also include generating a display that instructs a pilot in the current aircraft 160 to take the selected taxi exit (e.g., taxi exit 140C), as at 755.

The method 700 may also include causing the current aircraft 160 to take the selected taxi exit (e.g., taxi exit 140C), as at 760. This may include automatically decelerating (e.g., braking) the aircraft at a rate that will allow the current aircraft 160 to have a safe speed to turn onto the selected taxi exit (e.g., taxi exit 140C) by the time that the current aircraft 160 reaches the selected taxi exit (e.g., taxi exit 140C) on the runway 110. This may also or instead include automatically turning the current aircraft 160 from the runway 110 onto the selected taxi exit (e.g., taxi exit 140C).

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method for selecting a taxi exit on a runway for an aircraft that lands on the runway, the method comprising:
- receiving historical data, wherein the historical data comprises:
  - historical runway data for a runway, wherein the historical runway data comprises:
    - a length of the runway,
    - a length and a location of a touch-down zone on the runway, and
    - locations of a plurality of taxi exits along the runway;
  - historical aircraft data for previous aircrafts that have landed on the runway, wherein the historical aircraft data comprises:
    - specification information of the previous aircrafts,
    - published aircraft performance data for the previous aircrafts,
    - speeds in the air of the previous aircrafts in a time period before landing,
    - elevations of the previous aircrafts in the time period before landing,
    - trajectories of the previous aircrafts in the time period before landing,
    - distances between the previous aircrafts and the runway in the time period before landing,
    - touch-down locations on the runway of the previous aircrafts,
    - displaced thresholds for the previous aircrafts,
    - decelerations on the runway of the previous aircrafts,
    - the taxi exits used by the previous aircrafts,
    - taxi times after landing of the previous aircrafts, and
    - fuel consumed after landing of the previous aircrafts;
  - historical weather data at a location of the runway; and
  - historical notice to air missions (NOTAMs) for the previous aircrafts, the runway, or both;
- training a model using the historical data to produce a trained model;
- receiving current pre-landing data for a current aircraft that is to land on the runway, wherein the current pre-landing data comprises:
  - current pre-landing aircraft data for the current aircraft, wherein the current pre-landing aircraft data comprises:
    - specification information of the current aircraft,
    - published aircraft performance data for the current aircraft,
    - a speed in the air of the current aircraft in the time period before landing,
    - an elevation of the current aircraft in the time period before landing,
    - a trajectory of the current aircraft in the time period before landing, and
    - a distance between the current aircraft and the runway in the time period before landing;
  - current weather data at the location of the runway; and
  - a current NOTAM for the current aircraft, the runway, or both;
- determining, during the time period before landing, a feasibility of the plurality of taxi exits on the runway based at least partially upon the trained model and the current pre-landing data, wherein determining the taxi exit feasibility comprises dividing the plurality of taxi exits into at least a first group and a second group, wherein the current aircraft will either overshoot the first group of taxi exits or have to decelerate more than a predetermined deceleration threshold to access the first group of taxi exits if the current aircraft lands within the touch-down zone on the runway and does not have to turn around on the runway, and wherein the current aircraft will neither overshoot the second group of taxi exits nor have to decelerate more than the predetermined deceleration threshold to access the second group of taxi exits if the current aircraft lands within the touch-down zone on the runway and does not have to turn around on the runway;
- determining a touch-down location for the current aircraft based at least partially upon the trained model, the current pre-landing data, and the feasibility;

receiving current post-landing data after the current aircraft lands on the runway, wherein the current post-landing data comprises:

current post-landing aircraft data for the current aircraft, wherein the current post-landing aircraft data comprises:

the touch-down location of the current aircraft on the runway; and a speed of the current aircraft on the runway;

updating the feasibility during a time period after landing to produce an updated feasibility, wherein the updated feasibility is based at least partially upon the trained model, the current pre-landing data, and the current post-landing data; and selecting one of the taxi exits in the second group based at least partially upon the updated feasibility.

2. The method of claim 1, further comprising determining the taxi times for the current aircraft to use each of the taxi exits in the second group based at least partially upon the trained model, the current pre-landing data, the current post-landing data, and the updated feasibility, wherein the selected taxi exit is also selected based at least partially upon the determined taxi times.

3. The method of claim 1, further comprising determining the fuel consumption for the current aircraft to use each of the taxi exits in the second group based at least partially upon the trained model, the current pre-landing data, the current post-landing data, and the updated feasibility, wherein the selected taxi exit is also selected based at least partially upon the determined fuel consumption.

4. The method of claim 1, further comprising generating a display that instructs a pilot in the current aircraft to take the selected exit.

5. The method of claim 1, further comprising causing the current aircraft to take the selected taxi exit.

6. The method of claim 1, wherein the historical aircraft data comprises the historical NOTAMs for the previous aircrafts.

7. The method of claim 1, wherein the historical aircraft data comprises the historical NOTAMs for the runway.

8. The method of claim 1, wherein the historical aircraft data comprises the historical NOTAMs for the previous aircrafts and the runway.

9. The method of claim 1, wherein the current pre-landing aircraft data comprises the current NOTAM for the current aircraft.

10. The method of claim 1, wherein the current pre-landing aircraft data comprises the current NOTAM for the runway.

11. The method of claim 1, wherein the current pre-landing aircraft data comprises the current NOTAM for the current aircraft and the runway.

12. The method of claim 1, wherein the current aircraft will overshoot the first group of taxi exits if the current aircraft lands within the touch-down zone on the runway and does not have to turn around on the runway.

13. The method of claim 1, wherein the current aircraft will have to decelerate more than a predetermined deceleration threshold to access the first group of taxi exits if the current aircraft lands within the touch-down zone on the runway and does not have to turn around on the runway.

14. A non-transitory computer-readable medium storing instructions that, when executed by one or more processors of a computing system, cause the computing system to perform operations, the operations comprising:

receiving historical data, wherein the historical data comprises:

historical runway data for a runway, wherein the historical runway data comprises:

a length of the runway, a length and a location of a touch-down zone on the runway, and locations of a plurality of taxi exits along the runway;

historical aircraft data for previous aircrafts that have landed on the runway, wherein the historical aircraft data comprises:

specification information of the previous aircrafts, published aircraft performance data for the previous aircrafts, speeds in the air of the previous aircrafts in a time period before landing, elevations of the previous aircrafts in the time period before landing, trajectories of the previous aircrafts in the time period before landing, distances between the previous aircrafts and the runway in the time period before landing, touch-down locations on the runway of the previous aircrafts, displaced thresholds for the previous aircrafts, decelerations on the runway of the previous aircrafts, the taxi exits used by the previous aircrafts, taxi times after landing of the previous aircrafts, and fuel consumed after landing of the previous aircrafts;

historical weather data at a location of the runway; and historical notice to air missions (NOTAMs) for the previous aircrafts, the runway, or both;

training a model using the historical data to produce a trained model;

receiving current pre-landing data for a current aircraft that is to land on the runway, wherein the current pre-landing data comprises:

current pre-landing aircraft data for the current aircraft, wherein the current pre- landing aircraft data comprises:

specification information of the current aircraft, published aircraft performance data for the current aircraft, a speed in the air of the current aircraft in the time period before landing, an elevation of the current aircraft in the time period before landing, a trajectory of the current aircraft in the time period before landing, and a distance between the current aircraft and the runway in the time period before landing;

current weather data at the location of the runway; and a current NOTAM for the current aircraft, the runway, or both;

determining, during the time period before landing, a feasibility of the plurality of taxi exits on the runway based at least partially upon the trained model and the current pre-landing data, wherein determining the taxi exit feasibility comprises dividing the plurality of taxi exits into at least a first group and a second group, wherein the current aircraft will either overshoot the first group of taxi exits or have to decelerate more than a predetermined deceleration threshold to access the first group of taxi exits if the current aircraft lands within the touch-down zone on the runway and does not have to turn around on the runway, and wherein the current aircraft will neither overshoot the second group of taxi exits nor have to decelerate more than the predetermined deceleration threshold to access the second group of taxi exits if the current aircraft lands within the touch-down zone on the runway and does not have to turn around on the runway;

determining a touch-down location for the current aircraft based at least partially upon the trained model, the current pre-landing data, and the feasibility;

receiving current post-landing data after the current aircraft lands on the runway, wherein the current post-landing data comprises:

current post-landing aircraft data for the current aircraft, wherein the current post-landing aircraft data comprises:

the touch-down location of the current aircraft on the runway; and a speed of the current aircraft on the runway;

updating the feasibility during a time period after landing to produce an updated feasibility, wherein the updated feasibility is based at least partially upon the trained model, the current pre-landing data, and the current post-landing data; and selecting one of the taxi exits in the second group based at least partially upon the updated feasibility.

15. The non-transitory computer-readable medium of claim 14, wherein the operations further comprise determining the taxi times for the current aircraft to use each of the taxi exits in the second group based at least partially upon the trained model, the current pre-landing data, the current post-landing data, and the updated feasibility, wherein the selected taxi exit is also selected based at least partially upon the determined taxi times.

16. The non-transitory computer-readable medium of claim 14, wherein the operations further comprise determining the fuel consumption for the current aircraft to use each of the taxi exits in the second group based at least partially upon the trained model, the current pre-landing data, the current post-landing data, and the updated feasibility, wherein the selected taxi exit is also selected based at least partially upon the determined fuel consumption.

17. The non-transitory computer-readable medium of claim 14, wherein the operations further comprise generating a display that instructs a pilot in the current aircraft to take the selected exit.

18. The non-transitory computer-readable medium of claim 14, wherein the operations further comprise causing the current aircraft to take the selected taxi exit.

19. The non-transitory computer-readable medium of claim 14, wherein the historical aircraft data comprises the historical NOTAMs for the previous aircrafts.

20. The non-transitory computer-readable medium of claim 14, wherein the historical aircraft data comprises the historical NOTAMs for the runway.

* * * * *